April 7, 1964  M. FEINBERG  3,128,043
FAIL SAFE THERMOSTAT
Filed April 30, 1962  2 Sheets-Sheet 1
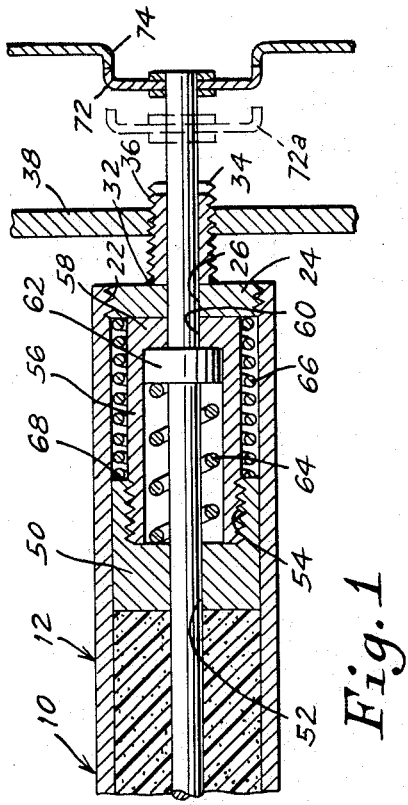
Fig. 1
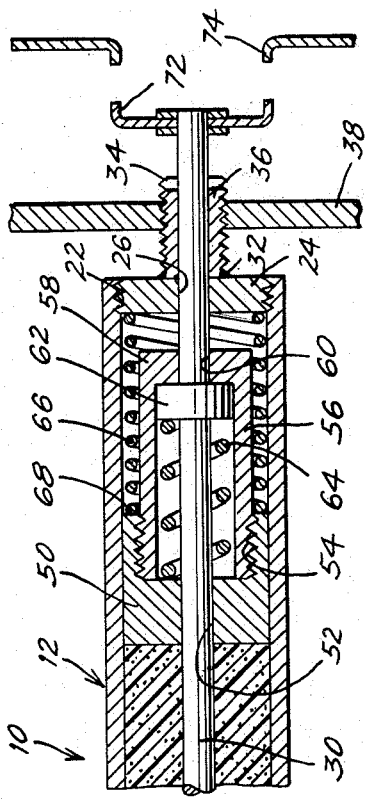
Fig. 2
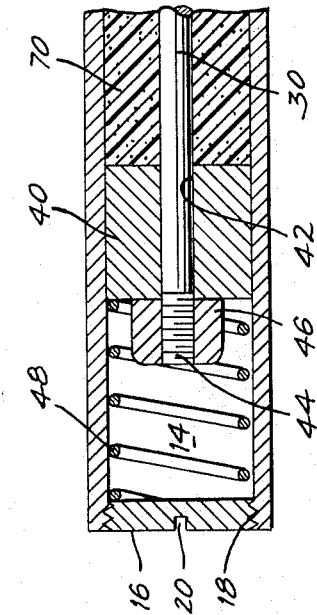
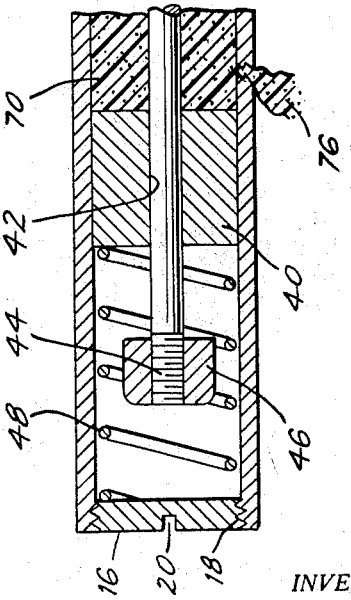
INVENTOR
Maurice Feinberg
By Diggins + LeBlanc
ATTORNEYS April 7, 1964  M. FEINBERG  3,128,043
FAIL SAFE THERMOSTAT Filed April 30, 1962  2 Sheets-Sheet 2

INVENTOR
Maurice Feinberg
Diggins + LeBlanc
ATTORNEYS

United States Patent Office 3,128,043
Patented Apr. 7, 1964

3,128,043
FAIL SAFE THERMOSTAT
Maurice Feinberg, 2 Jackson St., Waltham, Mass.
Filed Apr. 30, 1962, Ser. No. 191,166
19 Claims. (Cl. 236—93)

This invention relates to a thermosensitive control device and more particularly to a thermosensitive actuator for a control device which, upon leakage or failure of the expandable heat sensitive actuating material, will drive the control device to a predetermined position.

In certain instances in the handling or control of fluids it is highly desirable if not absolutely necessary that various control valves lock in a predetermined position in case the valve actuator should fail. This is particularly true where the fluid being controlled by the valve is used to cool or control the operating temperature of a machine or chemical process. One of the most common uses of a thermally sensitive valve for controlling the operating temperature of a device occurs in the cooling radiators of internal combustion engines. As is well known, a thermostatic device is normally included in the fluid line between the radiator and the engine for controlling the cooling of the engine during operation. While the engine is "cold" the thermostat normally remains in a closed position thereby furnishing the engine with little or no coolant. This causes the engine to rapidly "heat up" until a proper operating temperature is reached at which time the thermostat opens a sufficient amount to allow the passage of a predetermined amount of coolant necessary for maintaining the engine at its normal operating temperature.

Needless to say, a failure of the thermostat to open once the engine has reached its proper operating temperature will result in the engine overheating and eventually becoming severely damaged. Thus, it has been found highly desirable to provide an actuator for such control valves that will move the valve to an open position in case of failure in the actuator thereby preventing damage to the engine. Obviously, various other equally important uses for a valve actuator that moves to a predetermined position in case of a failure will be readily apparent.

Various types of so-called "fail-safe" thermosensitive actuator devices utilizing expandable materials have been known for some time but these devices normally depend upon a special type valve for their proper operation. The most common of these prior known fail-safe devices relies on the movement of a valve beyond its normal closed position rather than back to its normal open position. Thermostats of this type are limited in their use both due to their initial manufacturing cost and to their inability to replace or control certain slide valves now found in common use.

According to the present invention it has been found that the use of a special valve for obtaining a fail-proof thermostat can be completely eliminated by using an actuator having a spring arrangement which automatically moves the valve being controlled to a predetermined normal position upon failure of the actuator. Usually this spring arrangement employs three springs, two of which are utilized in the normal operation of the actuator while the third comes into use only upon a failure of the actuator. Greater driving or operating power for the valve being controlled plus a leakage proof feature is also added to the actuator by using a thermosensitive polyethylene plastic material as the operating or force producing device within the actuator.

Accordingly, a primary object of this invention is to provide an improved thermosensitive actuator.

Another object of this invention is to provide an actuator of the fail-safe type.

Yet another object of this invention is to provide an actuator that will move when exposed to increases in temperature from a first to a second position but which will automatically find and stay in the second position in case of a failure in the actuator.

Yet still another object of this invention is to provide a thermal actuator utilizing a polyethylene plastic.

A further object of this invention is to provide a fail-safe thermostat.

A still further object of this invention is to provide a fail-safe thermostat that requires no special valve or linkage arrangement for obtaining the fail-safe feature.

Yet still a further object of this invention is to provide a fail-safe thermostat that in case of failure of the actuator will assume an open position.

Another object of this invention is to provide a fail-safe thermostat having the above desired characteristics yet which is inexpensive to manufacture, easy to install and requires little or no maintenance for proper operation.

These and further objects and advantages of the present invention will become more apparent upon reference to the following specification, claims and appended drawings wherein:

FIGURE 1 is a cross-sectional view of a thermally responsive actuator, constructed in accordance with one concept of the present invention, connected to and maintaining a valve in a normally closed condition;

FIGURE 2 is a cross-sectional view of an actuator after a failure has occurred and the valve has been driven to its open position;

Figure 3:
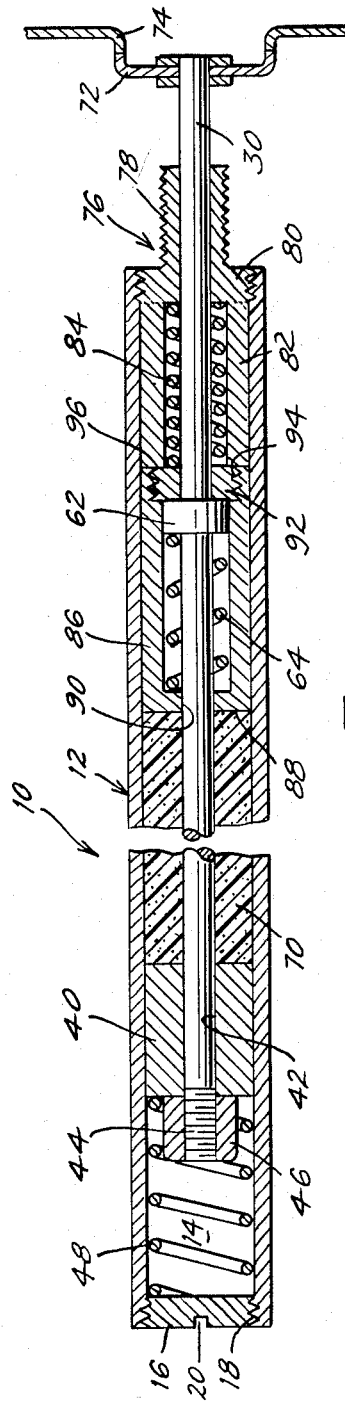
FIGURE 3 is a cross-sectional view showing another embodiment of the present invention utilizing a modified collar arrangement.

With continuing reference to the accompanying drawings wherein like reference numerals designate similar parts throughout the various views, and with initial attention directed to the embodiment of the invention as shown in FIGURE 1, reference numeral 10 is used to generally designate a fail-safe thermally responsive control device constructed in accordance with one concept of the present invention. The control device illustrated comprises a housing, designated generally at 12 and usually formed of copper or Monel metal since brass tends to crack under the high pressures involved, which includes a relatively large bore or cavity 14 that extends throughout its length. The bore 14 is usually of a cylindrical shape due to the ease of manufacturing such shapes but it is to be understood, however, that the cross-sectional configuration is relatively unimportant and could be square, triangular or any other desired shape so long as the various elements contained in and movable through the bore snugly fit against the bore wall so that any leakage of moisture or other substances into or out of the bore is prevented.

The left hand end of the housing 12 is closed by an end plug 16 which is securely held within the apertured end by any suitable means such as by using a threaded surface 18. The plug 16 is preferably keyed as at 20 to provide for removing or adjusting the distance which the end plug extends into the threaded end of the housing. The right hand end of the housing 12 is also threaded at 22 and adapted to receive an end plug 24 somewhat similar to end plug 16. The end plug 24 is, however, formed with an axially disposed bore 26 through which an actuating or valve operating rod 30 is slidably disposed. Secured by any suitable means such as an annular weld 32 to the outer surface of the end plug and surrounding the rod 30 is an adjusting and mounting collar 34 having external threads 36. The collar 34 is threadably received in a support or other mounting surface generally indicated at 38 and by rotating collar 34, along with the casing 12, it is possible to advance or retard the control device and thus the actuating rod 30 with respect to the support 38. By this threading or rotating motion of the actuator in the support 38, a fine or zero setting of the control device can be obtained once the control device is mounted and connected to a valve so that the exact opening and closing temperature of the valve can be regulated.

Positioned within the bore 14 is a brass piston 40 formed with an annular bore 42 which surrounds the left hand end of the rod 30. The diameter of the bore 42 is large enough so that the piston 40 is free to move in respect to both the housing 12 and the rod 30 for reasons that will be more fully explained hereinafter. The extreme left hand end of the rod 30 is threaded at 44 for receiving a lock nut 46 utilized in preventing the piston 40 from sliding off the end of the rod when the piston is driven to the left. A coil compression spring 48, which has a sufficiently large internal diameter so that it will fit over the nut 46 without restricting its movement, is mounted between the adjustable end plug 16 and the freely movable piston 40.

A second brass piston 50 having an annular bore 52 is slidably mounted around substantially the center of the rod 30 and within the housing 12. The right hand end of the piston 50 is counter-bored and threaded at 54 and adapted to receive a brass collar 56. Collar 56 has a closed end 58 provided with an annular spaced bore 60 through which the operating rod 30 passes.

A spring pressure plate or washer 62 is securely mounted on or formed as an integral part of the rod 30 and is housed within the collar 56 as seen in FIGURES 1 and 2. Also located within the collar 56 and surrounding the rod 30 is a coil spring 64 which is maintained in a slightly compressed state between the plate 62 and the piston 50. Positioned around the outer periphery of the collar 56 is another coil spring 66 which is maintained in a normally compressed state between the plug 24 and the right hand surface 68 of the piston 50.

Located within the housing 12 between the pistons 40 and 50 is a thermally responsive actuating material 70 which, in the preferred embodiment of this invention, is formed of polyethylene plastic and preferably a low density polyethylene plastic in the form of a tube. The term "low density" as used in this application is meant to embrace those polyethylene plastics having a specific gravity between 0.910 and 0.925, a useful temperature range of from 100–300° F. and which become plastic at about 194° F. The use of the polyethylene plastic that falls within the above specific gravity and temperature ranges for thermal actuators has several decisive advantages including: (1) a maximum co-efficient of expansion per degree rise in temperature, (2) low density relative to metallic solids which operate in a comparable range of temperatures, and (3) a minimization of the leakage problem normally encountered where liquid or low melting substances are utilized as a thermally responsive actuating material. This leakage problem is completely avoided in the present invention since the polyethylene plastic remains in either a solid or semi-solid state throughout the above temperature range and therefore cannot leak out around the various sealing surfaces such as between the pistons 40 and 50 and the wall of the housing 12.

In normal operation, the application of heat to the housing 12, such as would occur if the housing of the control device were exposed to steam or hot water, will result in the thermally responsive plastic tube 70 expanding thereby exerting a high driving force upon the pistons 40 and 50. Since the collar 56, which is directly connected to the piston 50, is held flush against the end plug 24 by the compressed coil spring 48 acting through the piston 40 and plastic tube 70, no movement of the piston to the right will occur and all the force exerted by the expanding plastic tube 70 will be expended in forcing the movable piston 40 to the left against the pressure of the coil spring 48. This movement of the piston 40 will also move the nut 46, which normally rests against the piston 40, and the rod 30 to the left against the pressure of the coil spring 64 until an equilibrium is reached between the force or pressure exerted by the expanding plastic tube and the opposing pressure produced by the coil springs 48 and 64 as they are compressed.

From the above, it will be readily apparent that a valve 72 connected to the right hand end of the operating rod 30 will be operated from a first closed position in relation to a valve seat 74, as indicated in FIGURE 1, into a second or open position as indicated by the broken line 72a during the expansion of the plastic tube 70 and the movement of the operating rod 30 to the left. Once the heat applied to the housing 12 is removed the plastic tube 70 will contract or shrink to its original size thus permitting the piston 40 to be moved under the force of the compressed spring 48 to the right. The operation of this return spring 48 is necessary to assure that the plastic tubing returns to its exact original size or volume occupied before heating. The movement of the piston 40 to the right in turn permits the rod 30 to be driven to the right by the compressed coil spring 64 acting upon the piston 50 and washer 62 until the washer engages the end wall 58 of the collar 56 and the valve 72 is seated in its closed position on the valve seat 74. Thus it is seen that under normal operating conditions the end wall 58 of the collar 56 will always remain flush against the end plug 24 and the coil spring 66 will remain in a compressed state.

Assume, however, that there is a malfunction of the control device such as might occur if the housing 12 ruptured as shown at 76 in FIGURE 2 thus permitting the thermally sensitive plastic material 70 to escape. In prior known devices, this would result in the valve 72 being left in a closed and dangerous position. This driving of the valve 72 to the right and into a closed position is highly undesirable under certain conditions such as, for example, where the valve is controlling the flow of a coolant fluid from a radiator to a combustion engine. As explained above, it is readily seen that if the fluid circulating through an operating combustion engine were stopped due to a non-functioning control device, the engine would soon be damaged due to excess heat. In the case of the present fail-proof control device, the valve 72 will not move to the right against the valve seat 74 but will be moved to the left thus opening the valve rather than closing it as would occur with prior known control devices. This operating of the valve by the ruptured control device occurs in substantially the following manner.

As the termally responsive plastic material 70 escapes through the rupture 76, the coil spring 48 will expand thereby pushing or sliding the piston 40 to the right along the rod 30 until a point is reached where the spring is no longer exerting a sufficient force upon the piston 50 to overcome the force of the compressed coil spring 66. At this point the coil spring 66 will begin to move the piston 50 to the left thereby also moving the rod 30, which is held by the washer 62 and spring 64 against the end 58 of the collar 56, to the left through the aperture 42 in the piston 40. This in turn moves the valve 72 to the left away from the valve seat 74 and into an open condition.

From the above it is seen that the various compressed springs 48, 64 and 66 must be capable of exerting various compression forces upon the surface they bear against. In order to assure proper operation, the coil spring 48 should have a compression factor greater than the coil spring 64 while the compression factor of spring 64 should be greater than that of coil spring 66. By way of example, the compression factor of coil spring 48 could be approximately 25 pounds, spring 64 approximately 15 pounds, and spring 66 approximately 10 pounds. Obviously, these compression factors can be varied over a wide range and are given for purposes of clarity only.

In FIGURE 3 a second type control device is shown in which the arrangement of the coil springs 64 and 66 of FIGURE 1 has been varied by use of a modified collar arrangement. End plug 24 of FIGURE 1 has been replaced by a plug unit 76 including a hollow threaded collar 78 formed integral with the aperture in plug 80. The left hand end of the plug unit is counter-bored at 82 for receiving a reduced diameter coil spring 84 which serves the same function and has approximately the same compression factor as coil spring 66 in FIGURE 1.

A collar 86 having a closed end 88, through which an aperture 90 passes, is threaded upon plug 92 at 94. The coil spring 64 is positioned around the rod 30 and bears against the washer or plate 62 in substantially the same manner as shown in FIGURE 1. As seen in FIGURE 3, the collar 86 and plug 92 press against the collar 82 at 96 as long as the control device is operating properly. In case the thermally responsive material 70 is lost, the compressed coil spring 84 will once again move the rod 30 to the left as the coil spring 48 expands. The expansion of springs 48 and 84 compresses the thermally responsive material 70 so that it will escape through the rupture or malfunctioning cause thereby allowing spring 84 to unseat valve 72.

Figure 4:
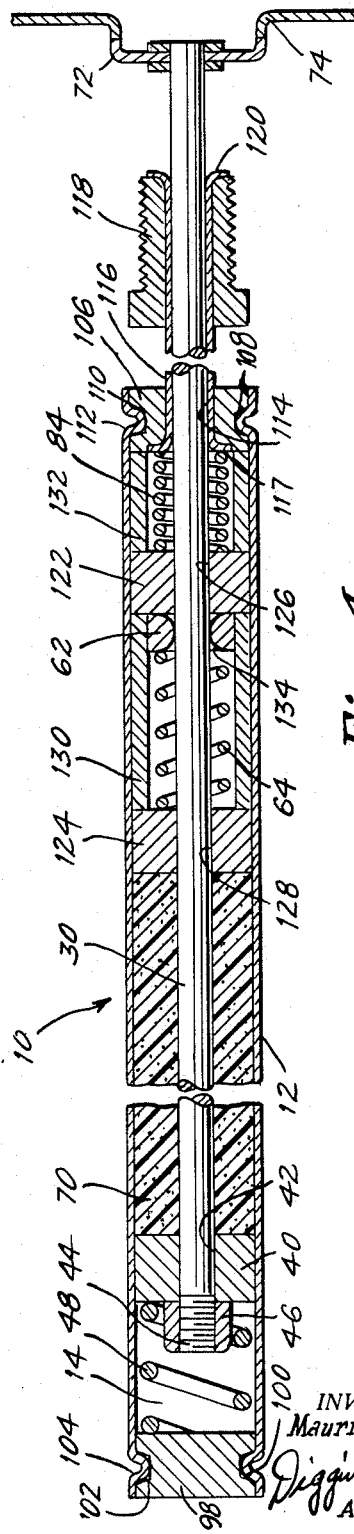
FIGURE 4 is a cross-sectional view of yet another embodiment of the present invention.

Another embodiment of the present invention is shown in FIGURE 4 which eliminates the use of threaded end plugs and collars thus reducing substantially the cost involved in producing the control device. In this embodiment, the end plug 98 is formed with a groove 100 around its periphery which has a small amount of solder 102 located therein. The plug 98 is sealed onto the end of the housing 12 by first rolling or swaging the housing into the groove 100 as shown at 104 and then heating the end to melt the solder 102 thus completely sealing any open area that might exist between the plug and housing.

The right hand end of the housing 12 is also sealed by an end plug 106 having a groove 108 and solder 110 by swaging and heating at 112. An aperture 114 is provided in the center of the end plug 106 for receiving a hollow collar or guide tube 116 which is swaged at 117 to provide a stop with the plug 106. Mounted over the right hand end of the guide tube 116 is an adjustable collar or screw 118 for regulation of the exact opening and closing temperature of the valve, said adjustable collar being held in place by the swaged end 120 of the tube. By using a guide tube 116, the threaded temperature adjustable collar 118 can be mounted any distance from the housing 12 that is desirable.

Located within the housing 12 is a pair of slidable pistons 122 and 124 which have apertures 126 and 128, respectively, through their center. The actuating rod 30 is passed through the hollow guide tube 116 and the apertures 126 and 128 of the pistons 122 and 124 so that both the pistons are free to move along the rod. A first cylindrical spacer 132 is provided between the end plug 106 and the piston 122 for maintaining the piston at a predetermined distance from the end plug. A second cylindrical spacer 130 is positioned between the pistons 122 and 124 for maintaining them a predetermined distance apart. The coil springs 64 and 84 are positioned around the rod 30 as disclosed above in relationship to FIGURE 3 while the spring plate or washer 62 is shown welded to the rod 30 at 134.

The operation of the device of FIGURE 4 in case of a loss of the thermally sensitive material 70 is substantially the same as disclosed in relationship to FIGURE 3. In the present instance the compressed coil spring 84 will expand when the pressure from the coil spring 48 is reduced thereby moving pistons 122 and 124 and the cylindrical spacer 130 to the left thus also moving the rod 30 to the left.

Although the preferred thermally sensitive material 70 is a low density polyethylene plastic tube due to its high co-efficient of expansion with corresponding low density relative to metallic solids within the desired range of temperatures, other thermally sensitive materials such as wax have been found to be usable to operate the control device even though they are substantially less effective. In order to prevent any leakage from occurring around the piston when a wax or like substance is used, O rings or silicone discs are used with the pistons 40 and 124.

It will be apparent from the foregoing that the control device of this invention is of a pull type as opposed to the normal push type and can be manufactured at a minimum cost, is rugged in construction and extremely dependable in operation. The use of a return spring assures that should a failure of the control device occur the valve will assume an open position thus making possible for the first time an actuator of a truly fail-safe type.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An actuator device comprising an elongated housing, actuating material comprising an annular, expandable, heat-sensitive plastic received within said housing, first movable means engaging one end of the actuating material, second movable means engaging the opposite end of said actuating material, operating means extending through the actuating material and operatively coupled to said first and second movable means, said operating means having one end portion extending to the exterior of said housing, and means associated with said second movable means for driving said operating means toward said first movable means when said actuating material is removed from said housing.

2. An actuator device comprising an elongated housing member, expandable actuating material comprising an annular, heat-sensitive plastic received within said housing member, first movable means engaging one end of said material, second movable means engaging the other end of said material, operating means coupled to said first means and extending through the actuating material and said second means to the exterior of said housing member, said operating means being moved in a first direction with said first movable means when said actuating material expands, means for moving said second movable means in said first direction when said actuating material is removed from said housing member and means associated between said second movable means and said operating means for moving said operating means in said first direction with said second movable means.

3. A thermosensitive actuator device comprising a hollow elongated housing member, an elongated annular plastic member received within said housing member, first movable means engaging one end of said plastic member, second movable means engaging the other end of said plastic member, operating means received through said second movable means and said annular plastic member, means coupling said operating means to said first movable means for moving said operating means in a first direction with said first movable means when said plastic member expands, said means permitting said operating means to move in a second direction free of said first movable means, drive means for moving said second member in said first direction when said plastic member is removed from said housing member, and means associated between said second movable means and said operating means for moving said operating means in said first direction with said second movable means.

4. A thermosensitive actuator device according to claim 3 wherein said operating means is connected to a valve means, said valve means being opened when said operating means is moved in said first direction.

5. A thermosensitive actuator device according to claim 4 wherein said housing member includes adjustable mounting means for adjusting the operating condition of said valve by movement of said actuator device.

6. A thermosensitive actuator device comprising a hollow elongated rigid casing, first plug means sealing one end of said casing, expandable actuating material located within said casing, first piston means located between said first plug means and said actuating material, first force means acting upon said first piston means for moving said first piston means and said actuating material in a first direction, second plug means sealing the other end of said casing, second piston means located between said second plug means and said actuating material, means for holding said second piston means from moving in said first direction, second force means acting upon said second piston means for moving said second piston means in a second direction when said actuating material is released from said casing, operating means, means connecting said operating means to said first piston means so that said operating means is moved in said second direction by said first piston means when said actuating material expands, and means connecting said operating means to said second piston means so that said operating means is moved in said second direction when said second piston means moves.

7. A thermosensitive actuator device according to claim 6 wherein said expandable actuating material is a plastic tube made of polyethylene.

8. A thermosensitive actuator device according to claim 6 wherein said first and second force means are springs.

9. A thermosensitive actuator device comprising a hollow elongated rigid casing, first plug means sealing one end of said casing, an elongated annular thermosensitive tube received within said casing, first movable piston means snugly received within said casing between said first plug means and one end of said tube, first spring means mounted between said first plug means and said first piston means for exerting a pressure on said tube through said first piston means, aperture means through said first piston means, operating rod means having one end thereof slidably extending through said tube and said aperture means of said first piston means, said rod means having nut means secured to said extended end for moving said rod means in a first direction when said first piston means is moved by said tube being placed in an expanded state, second plug means sealing the other end of said casing, said second plug means having an aperture through which the other end of said rod means slidably passes to the exterior of said casing, second movable piston means snugly received within said casing between said second plug means and the other end of said tube, aperture means in said second piston means through which said rod means slidably passes, hollow collar means having a partially closed end positioned between said second plug means and said second piston means, said partially closed end of said collar means abutting said second plug means and slidably surrounding said rod means, means securing said other end of said collar to said second piston, plate means located within said collar means and secured to said rod means, second spring means located within said collar means for pressing said plate means against said partially closed end of said collar means thereby moving said rod means in a second direction when said tube is in a contracted state, third spring means located between said second plug means and said second piston means for moving said second piston in said first direction when said tube is removed from said casing thereby moving said rod means in said first direction.

10. A thermosensitive device according to claim 9 wherein said first thermosensitive tube is a low density polyethylene plastic.

11. A thermosensitive device according to claim 9 wherein said first plug means is threaded in said casing for adjusting the pressure exerted on said first movable piston means.

12. A thermosensitive device according to claim 9 wherein said rod means passing to the exterior of said casing is connected to a valve, said valve being placed in an open condition when said rod means is moved in said first direction.

13. A thermosensitive valve comprising a hollow elongated rigid casing, a first plug threaded into one end of said casing for sealing said end, an elongated annular thermosensitive tube comprising a low density polyethylene plastic, a first movable piston having an aperture through its center slidably received within said casing between said first plug and one end of said tube, a first coil spring mounted between said first plug and said first piston for pressing said piston against said tube, an operating rod having one end thereof slidably extending through said tube and said aperture in said first piston, a nut secured to said one end of said rod for moving said rod in a first direction when said first piston is moved by said tube being placed in an expanded state by heating, a second plug threaded into the other end of said casing, said second plug having an aperture through which the other end of said rod means slidably passes to the exterior of said casing, a second movable piston slidably received within said casing between said second plug and the other end of said tube, an aperture through said second piston through which said rod slidably passes, a hollow collar positioned between said second plug and said second piston having an open and a partially closed end, said partially closed end of said collar abutting said second plug and slidably surrounding said rod, said open end of said collar being securely connected to said second piston, a plate secured to said rod and located within said collar, a second coil spring located within said collar for urging said plate against said partially closed end of said collar thereby moving said rod in a second direction when said tube is in a contracted state, a third coil spring located between said second plug and said second piston for moving said second piston in said first direction when said tube is removed from said casing so that said rod means is moved in said first direction, and valve means connected to the other end of said rod, said valve being placed in an open condition when said rod is moved in said first direction and in a closed condition when said rod is moved in a second direction.

14. A thermosensitive actuator device comprising a hollow elongated rigid casing, first plug means sealing one end of said casing, an elongated annular thermosensitive tube received within said casing, first movable piston means snugly received within said casing between said first plug means and one end of said tube, first spring means mounted between said first plug means and said first piston means for exerting a pressure on said tube through said first piston means, aperture means through said first piston means, operating rod means having one end thereof slidably extending through said tube and said aperture means of said first piston means, said rod means having nut means secured to said extended end for moving said rod means in a first direction when said first piston means is moved by said tube being placed in an expanded state, second plug means sealing the other end of said casing, said second plug means having an aperture through which the other end of said rod means slidably passes to the exterior of said casing, second movable piston means snugly received within said casing between said second plug means and the other end of said tube, aperture means in said second piston means through which said rod means slidably passes, third piston means snugly received within said casing between said second piston and said second plug means, aperture means in said second piston means through which said rod means passes, means for securing said third piston to said rod means, spacer means located between said second piston means and said third piston means for maintaining said second and third piston means a predetermined distance apart, second spacer means located between said third piston means and said second plug means for maintaining said third piston means and said second plug means a predetermined distance apart, second spring means located between said second and third piston means for moving said rod means in a second direction when said tube means is in a contracted state, and third spring means located between said third piston means and said second plug means for moving said rod means in said first position when said tube is removed from said casing.

15. A thermosensitive actuator device according to claim 14 wherein said thermosensitive tube means is a plastic tube made of a low density polyethylene.

16. A thermosensitive actuator device according to claim 14 wherein said first and second spacer means are hollow collars.

17. A thermosensitive actuator device according to claim 14 wherein said casing is provided with mounting means comprising guide tube means located around said rod means and secured at one end to said second plug means, and threaded temperature adjustable means secured to the other end of said guide tube means for adjustably mounting said actuator on a supporting surface.

18. A thermosensitive actuator device comprising a hollow elongated rigid casing, first plug means sealing one end of said casing, an elongated annular thermosensitive material received within said casing, first movable piston means snugly received within said casing between said first plug means and one end of said material, first spring means mounted between said first plug means and said first piston means for exerting a pressure on one end of said material through said first piston means, aperture means through said first piston means, operating rod means having one end thereof slidably extending through said material and said aperture means of said first piston means, said rod means having nut means secured to said extended end for moving said rod means in a first direction when said first piston means is moved by said material being placed in an expanded state by heating, second plug means sealing the other end of said casing, said second plug means having collar means formed on one side and a threaded mounting means on the other side thereof, said collar means being located within said casing, second piston means slidably mounted on said rod means and engaging said collar means, second collar means secured to said second piston and engaging against the other end of said material, pressure plate means located within said second collar means and secured to said rod means, second spring means mounted between said second collar and said plate means for forcing said rod means in a second direction when said material is in a contracted state, and third spring means mounted between said second piston means and said second plug means for forcing said second piston and rod means in said first direction when said material escapes from said casing.

19. A thermosensitive actuator device according to claim 18 wherein said thermosensitive material is a plastic tube made of low density polyethylene.

References Cited in the file of this patent
UNITED STATES PATENTS

| | | |
|---|---|---|
| 2,387,793 | Holmes | Oct. 30, 1945 |
| 2,795,381 | Eskin | June 11, 1957 |
| 2,915,248 | Noakes | Dec. 1, 1959 |
| 3,016,691 | Asakawa et al. | Jan. 16, 1962 |